(12) United States Patent
Sun

(10) Patent No.: US 6,555,981 B1
(45) Date of Patent: Apr. 29, 2003

(54) METHOD OF DETECTING REVERSE ROTATION OF DIRECT-CURRENT MOTOR BY USING BACK ELECTROMOTIVE FORCE

(75) Inventor: Yu-Hung Sun, Taipei (TW)

(73) Assignee: Lite-On it Corporation, Taipei (TW)

( * ) Notice: Subject to any disclaimer, the term of this patent is extended or adjusted under 35 U.S.C. 154(b) by 0 days.

(21) Appl. No.: 09/671,182

(22) Filed: Sep. 28, 2000

(51) Int. Cl.⁷ .............. G05B 5/00; H02H 7/08; H02P 1/00; H02P 3/00; H02P 7/00
(52) U.S. Cl. ............................. 318/459
(58) Field of Search .................. 318/280, 300, 318/362, 366, 368, 373, 459

(56) References Cited

U.S. PATENT DOCUMENTS

| | | | | |
|---|---|---|---|---|
| 3,947,737 A | * | 3/1976 | Kimura et al. ............. | 318/257 |
| 4,385,330 A | * | 5/1983 | Serafini .................... | 360/71 |
| 4,467,250 A | * | 8/1984 | Thomasson ............... | 318/436 |
| 4,654,566 A | * | 3/1987 | Erdman .................... | 318/254 |
| 4,678,973 A | * | 7/1987 | Elliott et al. .............. | 318/254 |
| 5,327,053 A | * | 7/1994 | Mann et al. ............... | 318/254 |
| 5,512,805 A | * | 4/1996 | Rohrbaugh et al. ........ | 318/254 |
| 5,570,258 A | * | 10/1996 | Manning .................. | 361/85 |
| 5,670,852 A | * | 9/1997 | Chipperfield et al. ...... | 318/250 |

* cited by examiner

Primary Examiner—Jeffrey Donels
(74) Attorney, Agent, or Firm—Rosenberg, Klein & Lee

(57) ABSTRACT

The present invention proposes a method of detecting reverse rotation of a DC motor by using the back EMF, wherein the back EMF of the DC motor is detected to judge whether the brakeage of the motor is finished. A simple electronic circuit is exploited to accomplish this work effectively. No additional sensors are required so that the cost can be reduced.

1 Claim, 2 Drawing Sheets

METHOD OF DETECTING REVERSE ROTATION OF DIRECT-CURRENT MOTOR BY USING BACK ELECTROMOTIVE FORCE

FIELD OF THE INVENTION

The present invention relates to a method of detecting reverse rotation of a direct-current (DC) motor by using the back electromotive force (EMF), wherein an EMF extract circuit is exploited to extract the EMF, and then a voltage comparator is exploited to measure this EMF. If it is higher than a threshold voltage, a signal is outputted to let a controller for controlling the DC motor stop working so as to prevent the reverse rotation of the DC motor.

BACKGROUND OF THE INVENTION

Conventional ways of judging whether a DC motor brakes to a halt generally use attached sensors such as optical interruptor or special mechanisms to rub the rotating shaft of the motor so as to judge whether the brakeage of the motor is finished. Therefore, additional sensors, special mechanisms, or circuits of higher price are required so that the cost is high.

The present invention aims to resolve the above problem.

SUMMARY OF THE INVENTION

The primary object of the present invention is to provide a method of detecting reverse rotation of a DC motor by using the back EMF, wherein the back EMF of the DC motor is detected to judge whether the brakeage of the motor is finished. A simple electronic circuit can be exploited to accomplish this work effectively. No additional sensors are required so that the cost can be reduced.

The various objects and advantages of the present invention will be more readily understood from the following detailed description when read in conjunction with the appended drawings, in which:

DETAILED DESCRIPTION OF THE PREFERRED EMBODIMENTS

Figure 1:
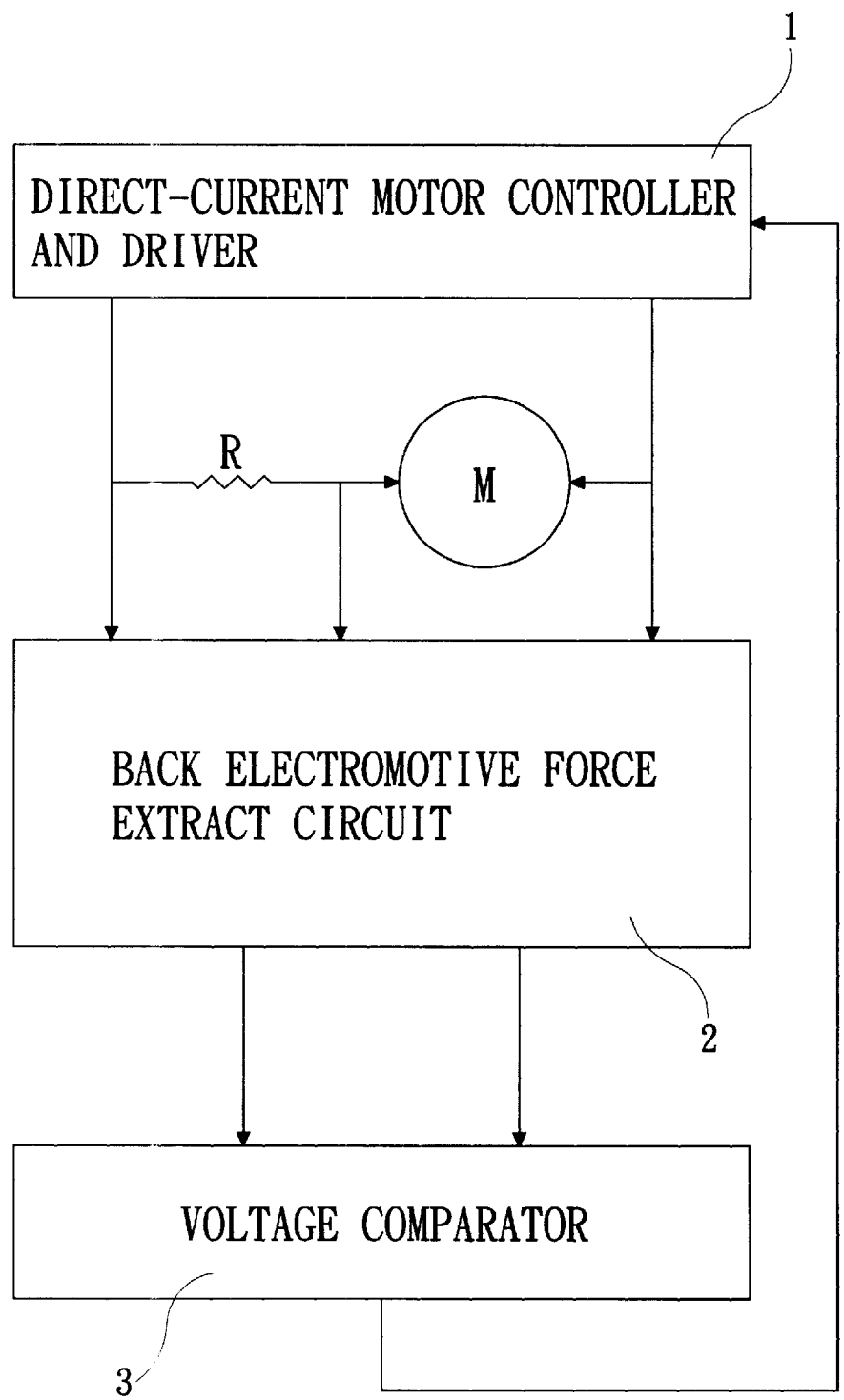
FIG. 1 is a circuit block diagram of the present invention.

FIG. 1 shows a circuit block diagram of the present invention, which comprises a DC motor controller and driver 1, a DC motor M, a proportional resistor R, a back EMF extract circuit 2, and a voltage comparator 3. The two output terminals of the DC motor controller and driver 1 are respectively connected to one terminal of the DC motor M and one terminal of the proportional resistor R, and are also respectively connected to two input terminals of the back EMF extract circuit 2. The other terminal of the DC motor M is connected to the other terminal of the proportional resistor R, and is then connected to another input terminal of the back EMF extract circuit 2. The output of the back EMF extract circuit 2 is connected back to the DC motor controller and driver 1.

Figure 2:
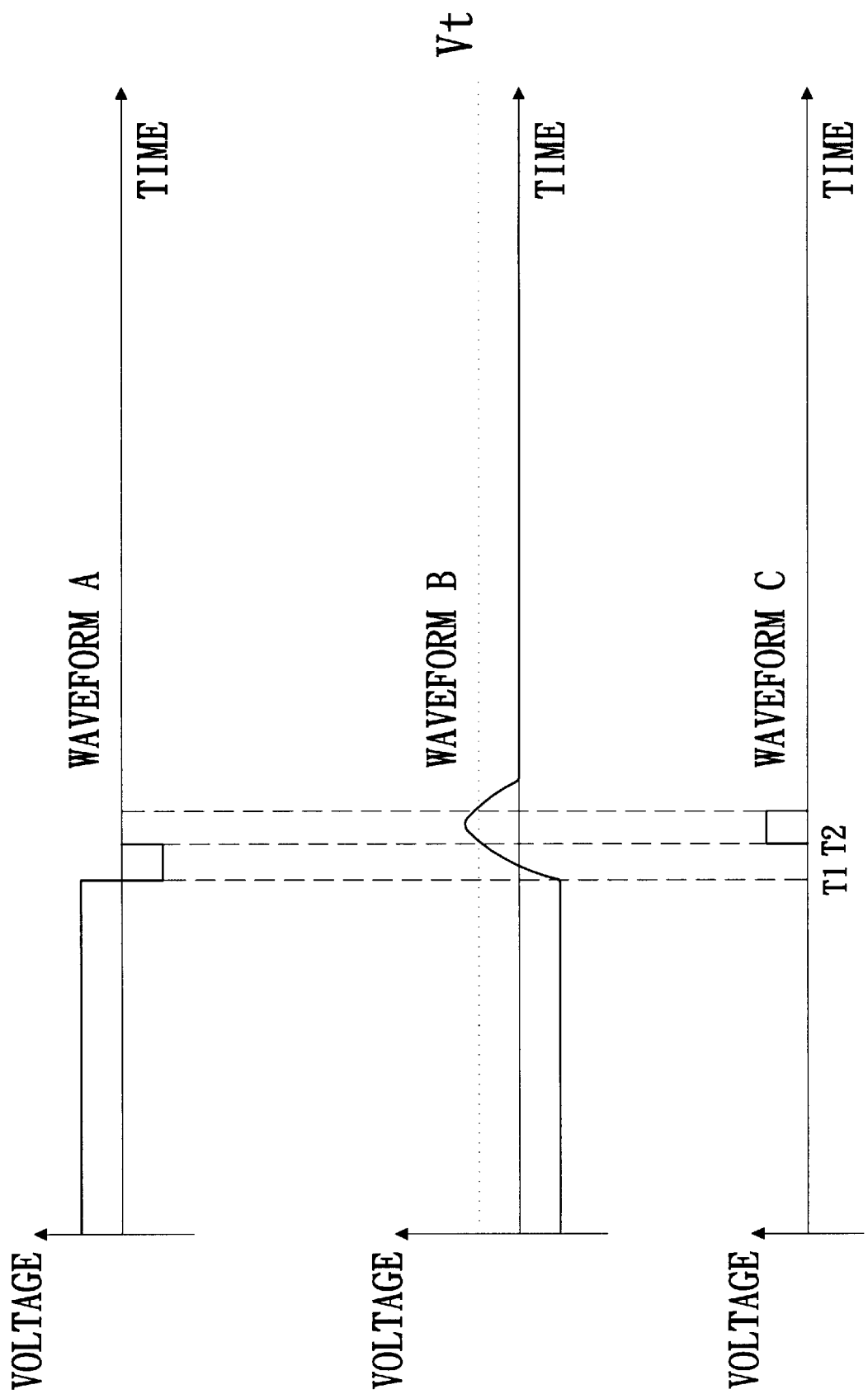
FIG. 2 shows waveform diagrams of the present invention.

FIG. 2 shows waveform diagrams of the present invention, wherein waveform A is the output of the DC motor controller and driver 1, waveform B is the output of the back EMF extract circuit 2, and waveform C is the output of the voltage comparator 3. When the DC motor M rotates in positive direction, the DC motor controller and driver 1 will output a reverse brake voltage to both the DC motor M and the proportional resistor R at time T1. The back EMF extract circuit 2 will then extract the back EMF striding over the DC motor M. Based on the proportional relationship between the back EMF and the rotation speed of the DC motor M and the reverse relationship of the direction of the back EMF and the rotation direction of the DC motor M, the rotation speed of the DC motor M will reduce gradually, while the extracted back EMF will increase gradually. The extracted back EMF is then outputted to the voltage comparator 3. When the back EMF is higher than a threshold voltage $V_t$ at time T2, representing the reverse brake voltage of the DC motor controller and driver 1 is too large, the DC motor M will change to rotate in reverse direction. The voltage comparator 3 will output a reverse-rotation judgment signal, which will be transferred back to the DC motor controller and driver 1 to let it stop outputting the reverse brake voltage. Thereby, the brakeage of the DC motor M is finished.

To sum up, the present invention has the following advantages.

1. A simple circuit is exploited to detect effectively whether the brakeage of a DC motor is finished. Moreover, the brake time of the DC motor can be reduced so that the same effect as that of using sensors can be achieved.
2. Because no additional sensors are required, the cost can be greatly reduced.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A method of detecting an onset of reverse rotation of a direct-current motor during an application of an active braking procedure, comprising the steps of:

(a) applying a reverse brake voltage to the direct-current motor from a controller;

(b) extracting a back electromotive force voltage from the motor;

(c) comparing said back electromotive force voltage to a predetermined threshold voltage indicative of the onset of reverse rotation of the direct-current motor using a voltage comparator and if said back electromotive force voltage is greater than said predetermined threshold voltage, outputting a reverse-rotation judgment signal to said controller; and, (d) terminating said application of said reverse brake voltage responsive to said output of said reverse-rotation judgment signal.

* * * * *